United States Patent [19]

Holmes

[11] Patent Number: 4,584,895
[45] Date of Patent: Apr. 29, 1986

[54] TRANSMISSION SHIFT CONTROL
[75] Inventor: Russell C. Holmes, Troy, Mich.
[73] Assignee: Eaton Corporation, Cleveland, Ohio
[21] Appl. No.: 619,462
[22] Filed: Jun. 11, 1984
[51] Int. Cl.[4] .......................... F16H 57/06; G05G 9/12
[52] U.S. Cl. .................... 74/476; 74/473 R; 74/475
[58] Field of Search ................ 74/473 R, 475, 476, 74/477

[56] References Cited

U.S. PATENT DOCUMENTS

| | | | |
|---|---|---|---|
| 3,541,879 | 11/1970 | Ravenel | 74/477 |
| 3,866,488 | 2/1975 | Nakata et al. | 74/475 |
| 3,937,100 | 2/1976 | Huffman | 74/476 |
| 3,998,110 | 12/1976 | O'Brien et al. | 74/476 |
| 4,120,212 | 10/1978 | Philipsen | 74/476 |
| 4,304,144 | 12/1981 | Takahashi | 74/475 |
| 4,359,910 | 11/1982 | Numazawa et al. | 74/476 |

Primary Examiner—Allan D. Herrmann
Attorney, Agent, or Firm—C. H. Grace; H. D. Gordon

[57] ABSTRACT

The compound detent mechanism (104) for a manual change gear transmission (10) of the type wherein engagement and disengagement reverse gear is controlled by a first shift rail (58) and engagement and disengagement of the lowest forward speed is controlled by an adjacent second shift rail (56) is provided. Detent mechanism (104) is carried by the shift block assembly (88) associated with the first shift rail and includes a first piston (132) resiliently blocking transverse alignment of a shift element with the contact surfaces (96, 98) associated with the second shift rail (56) associated with the lowest forward speed and a second piston element (114) resiliently blocking shifter element transverse alignment with the contact surfaces (100 and 102) associated with the first shift rail (58) associated with the reverse speed ratio.

20 Claims, 5 Drawing Figures

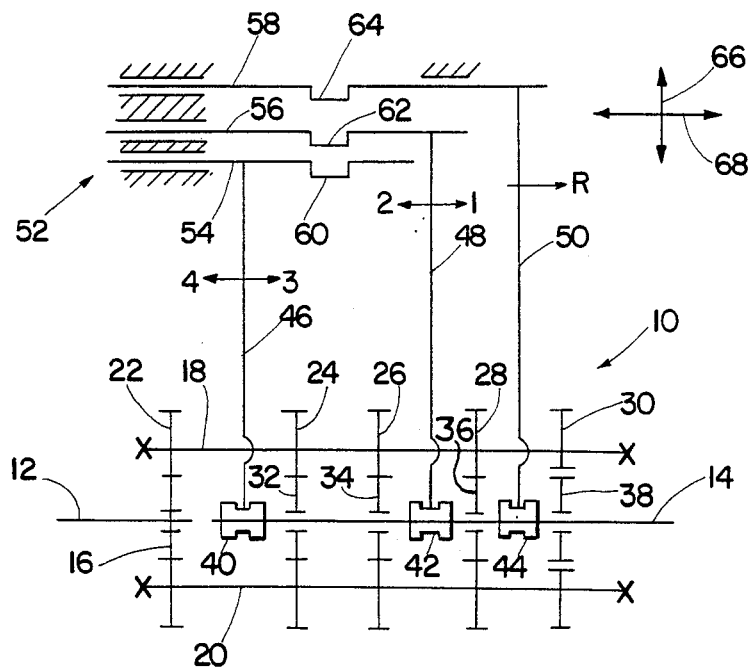
Fig. 1
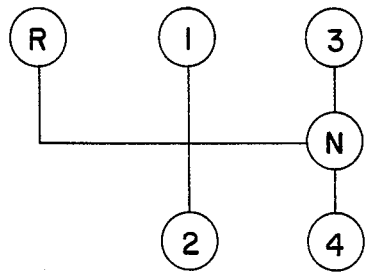
Fig. 2
| GEAR | R | 1 | 2 | 3 | 4 |
|---|---|---|---|---|---|
| RATIO | 8.15 | 8.86 | 4.30 | 2.08 | 1.00 |
| ΔN AT 600 RPM INPUT SHAFT N | 74 | 68 | 140 | 228 | 600 |
Fig. 3

TRANSMISSION SHIFT CONTROL

BACKGROUND OF THE INVENTION

1. Field of the Invention

The present invention relates to shift controls for manual change gear transmissions and in particular to shift controls for manual change gear transmissions, or transmission sections, having shift bar assemblies comprising at least three shift rails with the highest gear reduction forward speed (i.e., low gear) and reverse speed engaged by axial movement of separate adjacent shift rails.

2. Description of the Prior Art.

Manually shifted change gear transmissions utilizing shift bar assemblies comprising a plurality of generally parallel shift bars or rails, each of which rails carries a shift fork for axial movement therewith and which is axially movable from a neutral position in one or two axial directions to engage and disengage one or two selected gear ratios are well known in the prior art as may be seen by reference to U.S. Pat. Nos. 4,120,212; 4,304,144 and 3,998,110, the disclosures of all of which are hereby incorporate by reference. Such shift bar housing assemblies typically comprise an outer shift rail whcih is associated with reverse and/or low gear and a resilient detent or lockout mechanism which must be overcome or released to select the rail to prevent inadvertent selection thereof. Emamples of such detent and lockout mechanisms may be seen by reference to U.S. Pat. Nos. 3,541,879; 3,866,488 and 3,937,100, the disclosures of all of which are hereby incorporated by reference.

While such prior art mechanisms are well known and widely commercially utilized, they are not satisfactory for a transmission having two adjacent shift rails, one associated with the reverse speed or speeds and the other with the low forward speed or speeds ratios to prevent inadvertent selection of both shift rails.

SUMMARY OF THE INVENTION

In accordance with the present invention, the drawbacks of the prior art are overcome by the provision of a relatively simple, compound or double detent mechanism to prevent inadvertent selection of two adjacent transversely outer shift rails.

The above is accomplished by providing a first and a second spring biased plunger, preferably concentric, the first of which resiliently resists selection of the second most transversely outer one of the shift rails and the second of which resiliently resists selection of the transversely outermost one of the shift rails. The force required to resliently deflect the first plunger is a first value and the force to resiliently deflect the second plunger is a second value, considerably greater than the first value to provide a positive indication of correct selection of the two shift rails.

Accordingly, it is an object of the present invention to provide a new and improved shift control.

A further object of the present invention is to provide a new and improved shift control having a compound detent mechanism to resiliently resist selection of two adjacent, transversely outer shift rails to prevent inadvertent selection thereof.

These and other objects and advantages of the present invention will become apparent from a reading of the description of the preferred embodiment taken in connection with the attached drawings.

BRIEF DESCRIPTION OF THE DRAWINGS

FIG. 1 is a schematic illustration of a manual change gear transmission or transmission section utilizing the present invention.

FIG. 2 is a schematic illustration of the shift pattern of the transmission of FIG. 1.

FIG. 3 is a table illustrating the gear ratios of the transmission of FIG. 1.

DESCRIPTION OF THE PREFERRED EMBODIMENT

Figure 4:
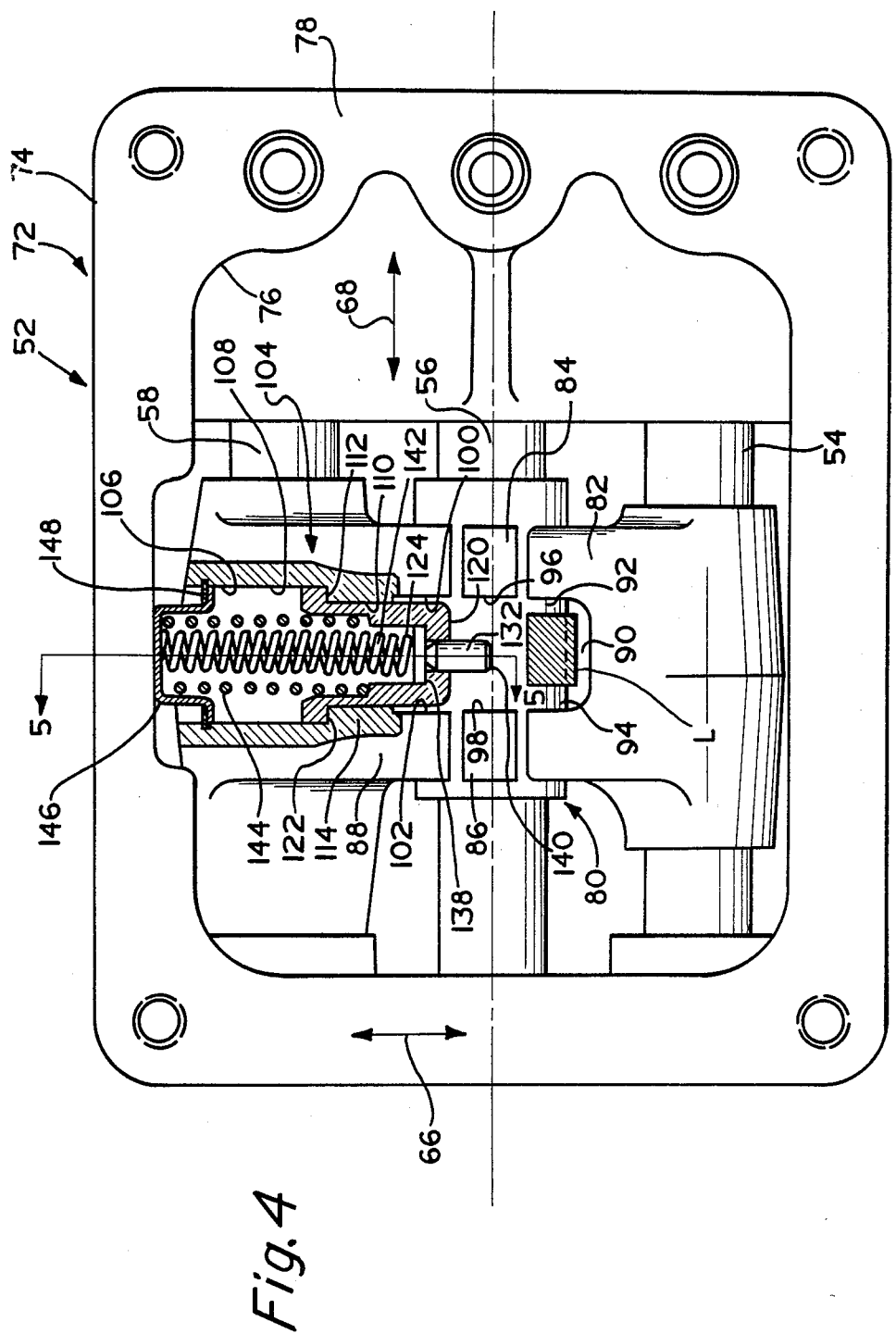
FIG. 4 is a partial top view, in section, of the shift mechanism of the present invention.

In the following description of the preferred embodiment, certain terminology will be utilized for purposes of reference only and are not intended to be limiting. For example, the terms "upward", "downward", "rightward" and "leftward" will refer to direction in the drawings to which reference is made. The terms "inward", and "outward" will refer to directions towards and away from, respectively, the geometric center of the device being described. The above applies to the terms specifically mentioned above and to words of similar inport.

A manual change gear transmission 10 of the type with which the shift control of the present invention is advantageously utilized may be seen by reference to FIG. 1, while the shift pattern therefore may be seen by reference to FIG. 2 and a chart or table illustrating the various gear reduction ratios between the input 12 shaft and output shaft 14 thereof may be seen by reference to FIG. 3. While transmission 10 is illustrated as a simple transmission having an input shaft 12 and an output shaft 14, it is understood, that transmission 10 may be a transmission section of a compound transmission. For example, transmission 10 may be the main section of a compound transmission and shaft 14 may define the input shaft to the auxiliary section (not shown) thereof. The shift control of the present invention is equally well suited for controlling the shifting operation of simple transmissions and/or transmission sections of compound transmission and, accordingly, the use of the term transmission as used herein is intended to refer to simple transmissions and/or transmission sections of auxiliary transmissions.

Transmission 10 includes an input shaft 12 supported at its forward end by a bearing (not shown) and provided with an input gear 16 nonrotatably or integrally attached thereto. In the illustrated embodiment, transmission 10 is provided with two countershafts 18 and 20, disposed on diametrically opposite sides of the output/mainshaft 14 thereof, which mainshaft is coaxial aligned with the input shaft 12. The input shaft 12 is normally driven in one direction only by a prime mover, such as a throttle control diesel engine (not shown) through a selectively engaged and disengaged master friction clutch (not shown) as is well known in the prior art.

Each of the countershafts 18 and 20 is provided with an identical grouping of countershaft gears 22, 24, 26, 28 and 30 thereon, which groupings form pairs of gears, such as the pair or gears 22, of identical size and number of teeth and disposed on diametrically opposite sides of the mainshaft 14.

A plurality of mainshaft drive gears 32, 34, 36 and 38 surround the mainshaft 14 and are selectively clutchable thereto, one at a time, by slidable positive jaw clutch collars 40, 42 and 44, respectively. Jaw clutch collar 40 may also clutch the input shaft 12 and/or input gear 16 directly to the mainshaft 14.

The mainshaft gears 32, 34 and 36 circle the mainshaft 14 and are in continuous meshing engagement with, and are preferably supported by the diametrically opposite pairs of countershaft gears 24, 26 and 28 respectively which mounting means and the special advantages resulting therefrom are explained in greater detail in U.S. Pat. Nos. 3,105,395 and 3,335,616, both assigned to the Assignee of this application and both hereby incorporated by reference. The mainshaft gear 38 is the reverse gear and is in continuous meshing engagement with the pair of countershaft gears 30 by means of conventional intermediate idler gears (not shown). The forward most countershaft gears 22 are continuously meshed with and driven by input gear 16 for causing simultaneous rotation of countershafts 18 and 20 whenever the input shaft is rotatably driven. Mainshaft gears 32, 34, 36 and 38 and countershaft gears 22, 24, 26, 28 and 30 and the unshown idler gears are all constantly meshed with and driven by the input gearing 16 and thus, in combination, form the input gearing of transmission 10.

As is known in the prior art, each of the clutch collars 40, 42 and 44 are preferably splined to mainshaft 14 for rotation therewith and amial movement relative thereto. Other mounting means for the clutch collars are known in the prior art and are intended to be included within the scope of the present invention. Preferably, each of the clutch collars is provided with external clutch teeth (not shown) which are interengageable with internal clutch teeth (not shown) provided on the gears 16, 32, 34, 36 and 38, each of the clutch collars 40, 42 and 44 is provided with an annular groove therein for receipt of a shift fork or shift yoke 46, 48 and 50, respectively, whereby the clutch collars are axially moved, one at a time only, from the positions illustrated in FIG. 1.

A shift bar housing assembly 52 comprising a plurality of axially moveable shift rails 54, 56 and 58 which are axially fixed to shift forks 46, 48 and 50, respectively, are provided for manually shifting transmission 10. Each of the shift rails 58, 56 and 54, respectively, is provided with a notch or a shift block member 60, 62 and 64, respectively, for engagement by the end or shift finger of a conventional shift lever (not shown) as is well known in the prior art, the end of the shift lever is moved in the direction of arrow 66 to align the shift fork with one of the shift rails and then is moved in the direction of arrow 68 to engage the notch or shift lock mechanism to cause an amial movement of the selected shift rail and shift fork carried thereby.

The shift pattern for shifting transmission 10 may be seen by reference to FIG. 2. Briefly, to engage the reverse speed, shift rail 58 and shift fork 50 carried thereby are moved rightwardly as seen in FIG. 1. To engage the first or second speed, respectively, shift rail 56 and shift fork 48 carried thereby is moved rightwardly or leftwardly, respectively. To engage the third or fourth speeds, respectively, shift rail 54 and shift fork 46 carried thereby is moved rightwardly or leftwardly, respectively. Movement of the shift lever in the direction of arrow 66 is generally referred to as the selection mode of operation, whereas movement of the shift lever in the direction of arrow 68 is generally referred to as the engagement mode of operation.

It is well known that the shift control mechanism of manually change gear transmissions should provide a means whereby inadvertent selection of the reverse mode of operation is prevented. Typically, this is provided by a lockout means or a resilient detent mechanism which must be released and/or overcome to allow selection of the shift rail associated with engagement of the reverse speed. Additionally, if the rotational speed differential between disengaged members of a jaw clutch (i.e. between the mainshaft gears 32, 34, 36 and 38 and jaw clutch collars 40, 42 and 44) is less than a predetermined value, such as about 150 rpm, is possible to inadvertently bump the shift lever and cause the jaw clutch members to become inadvertently engaged. In a transmission such as transmission 10, when the vehicle is at idle with the master clutch engaged the input shaft will be driven at about 600 rpm. As may be seen by reference to FIG. 3, the rotational speed difference between the positive jaw clutch members when the vehicle is at idle for first gear ("1") is only 68 rpm and for second gear ("2") is only 140 rpm. Accordingly, it is important to provide a detent mechanism to prevent accidental inadvertent selection of the shift rail (namely shift rail 56) associated with the first and second speed gears.

Accordingly, it is highly desireable to provide transmission shift control for a transmission such as transmission 10 which will provide detent means to prevent inadvertent selection of reverse speed and also to tend to prevent inadvertent selection of the shift rail associated with both the first and second forward speed gear ratios. As may be seen, in shift rail assembly 52, reverse gear is associated with shift rail 58 while the first and second forward speed gear ratios are associated with shift rail 56 which shift rails, 58 and 56, are adjacent and transversely outwardly located relative to the remaining shift rails, in this case shift rail 54.

Figure 5:
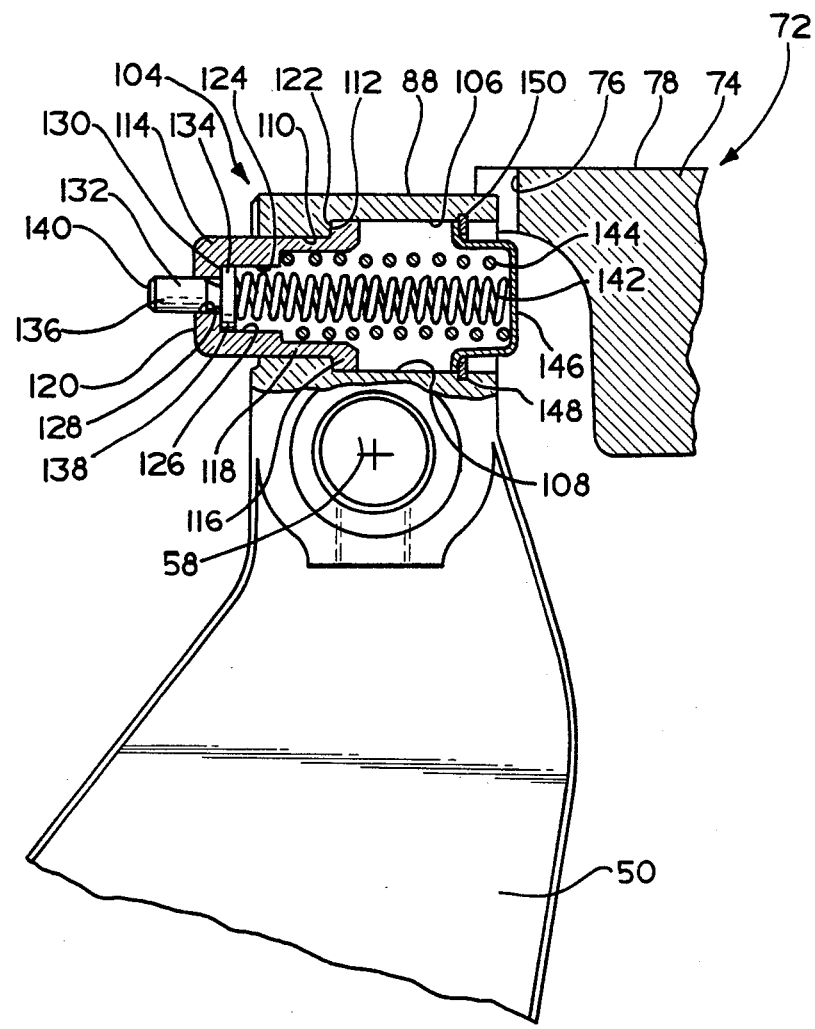
FIG. 5 is a sectional view taken along line 5—5 in FIG. 4.

The transmission shift control mechanism 72 of the present invention may be seen by reference to FIGS. 4 and 5. Shift bar housing assembly 52 is received within a shift bar housing 74 which may be integral with or attachable to the main transmission housing. Shift bar housing 74 defines an upwardly extending opening 76 through which the lower portion or shift finger L of a conventional shift lever may be received. Generally flat upper surface 78 is provided for mounting of the shift lever tower assembly or a remotely controlled shift lever assembly. Mounted for amial movement within the shift bar housing 74 are the three shift rails 54, 56 and 58 described below. An interlock mechanism (not shown) is preferably provided to prevent axial movement of more than one shift rail. Shift rail 54 carries shift fork 46 axially fimed thereto for axial movement of clutch collar 40, shift rail 56 carries shift fork 48 axially fixed thereto for axial movement of clutch collar 42 and shift rail 58 carries shift fork 50 axially fixed thereto for axial movement of shift collar 44. Shift control 72 defines a shift block assembly 80 which shift block assembly comprises a shift block member 82 fixed to shift rail 54, shift block members 84 and 86 fixed to shift rail 56, and a shift block member 88 fixed to shift rail 58. The shift block members 82, 84, 86 and 88 define a transversely extending slot 90 (extending in the direction of arrow 66) through which the end of a shift lever or a shift finger L may be moved in the direction of arrow 66 to align the shift finger with the contact surfaces 92, 94, 96, 98, 100 and 102 defined by the shift block members 82, 84, 86 and 88, respectively, as is well known in the prior art.

Briefly, to engage or disengage reverse gear, the shift finger is moved transversely into alignment with surfaces 100 or 102 and them moved axially in the direction of arrow 68 to contact one of the surfaces 100 or 102 to axially move the shift rail 58 and the shift fork 50 carried thereby. Similarly, to engage or disengage first and second speeds, the shift finger is moved into alignment with surfaces 96 and 98 and to engage or disengage fourth or fifth forward speeds the shift finger is moved into alignment with surfaces 92 or 94.

As discussed above, it is desireable to prevent inadvertent selection of the reverse and first and/or second forward speed gear ratios. To achieve this, a double detent mechanism 104 is provided which will resiliently resist alignment of the shift lever or shift finger with the shift block members 84 and 86 carried by shift rail 56 and shift block member 88 carried by shift rail 58. Resilient detent mechanism 104 is carried by shift block member 88, in a bore 106 provided therein. Bore 106 includes a larger diameter portion 108 and a smaller diameter portion 110 which are separated by a shoulder 112. The first pistion member 114 includes a larger outer diameter portion 116 slidably received in bore portion 108 and a smaller outer diameter portion 118, slidably received in bore portion 110. The transversely inward spaced end 120 of piston 114 will block entry of a shift lever or shift finger into the portion of slot 90 defined by surfaces 100 and 102 when piston 114 is at its most transversely inward position as limited by the contact of shoulder 122 between portions 116 and 118 of piston 114 contacting shoulder 112 between bore portions 108 and 110.

Piston 114 is provided with a transversely extending inner bore 124 defined by a larger inner diameter portion 126 and a smaller inner diameter portion 128 to define a shoulder 130 therebetween. A second or radially inner piston 132 includes a larger outer diameter portion 134 slidably received in bore portion 126 and a smaller outer diameter portion 136 slidably received in bore portion 128 defining a shoulder 138 therebetween. The transversely inner tip or surface 140 of portion 136 of piston 132, at its transveresly innermost position, as defined by the contact of shoulder 138 with shoulder 130, will resiliently block the entry of the end of a shift lever or shift finger into the portion of slot 90 defined between surfaces 96 and 98.

A first spring 142 biases smaller piston 132 into its transversely innermost position while a second spring 144 biases larger piston 114 to its transversely innermost position. Springs 142 and 144 are seated in a spring seat 146 retained in bore 106 by means of a snap ring 148 retained in a groove 150 provided in the inner diameter of bore 106. Spring 142 is a relatively light compression spring which biases smaller piston 132 transversely inwardly with a force of about five pounds. Spring 144 is a relatively heavier compression spring and requires a force of about 50 pounds for axial compression sufficiently to move larger piston member 114 transversely outwardly sufficient to allow a shift lever or shift finger to be transversely aligned with surfaces 100 or 102 on shift block member 88 for selection of reverse shift rail 58. Applying a force of about 50 pounds on surface 120 of piston 114 to compress spring 144 requires a force of about 10 pounds on the outer end of a shift lever.

Accordingly, it may be seen that a relatively simple and compact double detent structure 104 comprising two concentric pistons 114 and 132 received in a bore 106 in one of the shift block members is provided which will tend to resiliently bias the shift lever of shift finger out of transverse alignment with the shift block members, 84 and 86, associated with the shift rail 56 controlling the first and second forward speeds. Additionally, the detent mechanism provides a relatively large resilient detent force resisting alignment of a shift finger with the shift block member 88 associated with shift rail 58 for selecting reverse gear thereby preventing inadvertent selection of the reverse gear shift rail position and providing a positive indication of correct selection of the first and second speed shift rail 56.

It is understood, of course, that pistons 114 and 132 could be replaced by a single piston acted upon by a pair of independent coil springs.

While the preferred embodiment of the present invention has been described above with a certain degree of particularity, it is understood that certain substitution of and rearrangement of the parts thereof is possible within the spirit and the scope of the present invention as hereinafter claimed.

I claim:

1. A shift control mechanism for a gear shift lever operated manual change gear transmission;

a shift bar housing assembly comprising at least three transversely spaced substantially parallel longitundinally extending shift rails, a first most transversely outwardly located shift rail associated with a first shift fork for engagement and disengagement of a reverse speed gear ratio and a second shift rail transversely adjacent to said first shift rail and associated with a second shift fork for engagement and disengagement of the lowest forward gear ratio;

a first shift block mechanism carried by said first shift rail and defining a pair of first longitudinally spaced opposed transversely extending surfaces, a portion of said shift lever transversely moveable relative to said first shift rail for movement into and out of transverse alignment with said first surfaces for engagement therewith;

a second shift block mechanism carried by said second shift rail defining a second pair of longitudinally spaced transversely extending surfaces, said portion of said shift lever transversely moveable relative to said second shift rail for movement into and out of transverse alignment with said second surfaces for engagement therewith;

a detent mechanism comprising a first piston having a free end resiliently biased to extend between said second surfaces and resiliently displaceable toward said first shift rail and a second piston member coaxial with said first piston member and having a free end resiliently biased to be transversely aligned with said first surfaces and resiliently displaceable away from said third shift rail.

2. The shift control mechanism of claim 1, wherein said first piston is slidably received within a bore provided in said second piston.

3. The shift control mechanism of claim 2, wherein said second piston is slidably received within a transversely emtending bore provided in said first shift block mechanism.

4. The shift control mechanism of claim 3, wherein said first piston is biased toward said third shift rail by a first resilient force and said second piston is biased toward said third shift rail by a second resilient force, said second force greater than said first force.

5. The shift control mechansim of claim 4, wherein said second force is of a magnitude of approximately 5-15 times greater than said first force.

6. The shift control mechanism of claim 4, wherein said first piston is biased toward said third shift rail by a first spring and said second piston is biased toward said third shift rail by a second spring.

7. The shift control mechanism of claim 6, wherein said first spring is a coil spring, said second spring is a coil spring and said first spring is coaxially received within said second spring.

8. The shift control mechanism of claim 4, wherein transverse movement of said shift lever into transverse alignment with said second surfaces will resiliently displace said first piston away from said third shift lever and transverse movement of said shift lever into transverse alignment with said first surfaces will resiliently displace said second piston away from said third shift rail.

9. The shift control mechanism of claim 8, wherein said detent mechanism will resiliently urge said shift lever out of transverse alignment with said first and said second surfaces.

10. The shift control mechanism of claim 9, wherein said first shift block mechanism comprises a transversely extending first bore in which said second piston member is slidably received, said transversely extending first bore defining a shoulder engageable by a shoulder defined on said outer diameter of said second piston to limit transverse extension of said second piston toward said third shift rail, said second piston defines a transversely extending second bore in which said first piston is slidably received, said second bore defining a shoulder on the interior diameter thereof engageable by a shoulder defined on the outer diameter of said first piston to limit the transverse extension of said first piston toward said third shift rail.

11. The shift control mechanism of claim 10, wherein a spring seat is received within said first bore for retaining said first and second coil springs.

12. The shift control mechanism of claim 11, wherein said detent mechanism is longitundinally moveable with said first shift rail.

13. The shift control mechanism of claim 12, wherein said spring seat is retained in said first bore by means of a snap ring received in a groove provided in said first bore.

14. The shift control mechanism of claim 3, wherein said detent mechanism is longitundinally moveable with said first shift rail.

15. An improved shift control mechanism for a manually shifted change gear transmission operated by a shift element transversely and longitudinally moveable by a shift lever, said shift control mechanism comprising a longitudinally extending, longitudinally moveable first shift rail for selection of a reverse drive ratio, a second longitudinally extending, longitudinally moveable second shift rail, transversely adjacent to said first shift rail, for selection of the highest gear reduction forward speed drive ratio and a third longitudinally extending, longitudinally moveable shift rail, said first shift rail carrying a first shift block mechanism defining a pair of first longitudinally spaced, opposed, transversely extending first surfaces, said second shift rail carrying a second shift block mechanism defining a pair of second longitudinally spaced, opposed, transversely extending second surfaces, said third shift rail carrying a third shift block mechanism defining a pair of third longitudinally space, opposed, transversely extending third surfaces, said shift element transversely moveable relative to said shift rails into transverse alignment with said first, second and third surfaces and longitudinally moveable for engagement with the aligned one of said first, second and third pairs of surfaces, the improvement comprising;

a compound detent mechanism carried by and longitudinally moveable with said first shift rail for resiliently blocking movement of said shift element into transverse alignment with said second pair of surfaces with a first resilient force and resiliently blocking transverse movement of said shift element into tranverse alignment with said first pair of surfaces a second resilient force, said second resilient force of a greater magnitude than said first resilient force.

16. The improved shift control mechanism of claim 15, wherein said second force is at least five times the magnitude of said first resilient force.

17. The improved shift control mechanism of claim 16, wherein said compound detent mechanism comprises a piston assembly including a piston surface engageable by said shift element and moveable by said shift element transversely away from said third shift rail, a first spring resiliently urging said surface into transverse alignment with said first pair of surfaces and second spring means for resiliently urging said piston surface into transverse alignment with said second set of surfaces.

18. The improved shift control mechanism of claim 17, wherein said detent mechanism comprises a first piston slideably received in a transversely extending bore provided in said first shift block mechanism and having a free end in the nonresiliently displaced position thereof transversely aligned with said first surfaces and a second piston member slideably received in a transverse bore provided in said first piston member and having a free end in the nonresiliently displaced position thereof transversely aligned with said second surfaces.

19. The improved shift control mechanism of claim 18, wherein said first piston is resiliently biased toward said third shift rail by a first coil spring, said second piston is resiliently biased toward said third shift rail by a second coil spring, said first and second coil springs being coaxial.

20. The improved shift control mechanism of claim 19, wherein said second coil spring is telescopically surrounded by said first coil spring.

* * * * *